April 22, 1930.   J. L. JACKMAN   1,755,446
HOUSEHOLD COMBINATION CUTTING MACHINE
Filed July 14, 1927   5 Sheets-Sheet 2
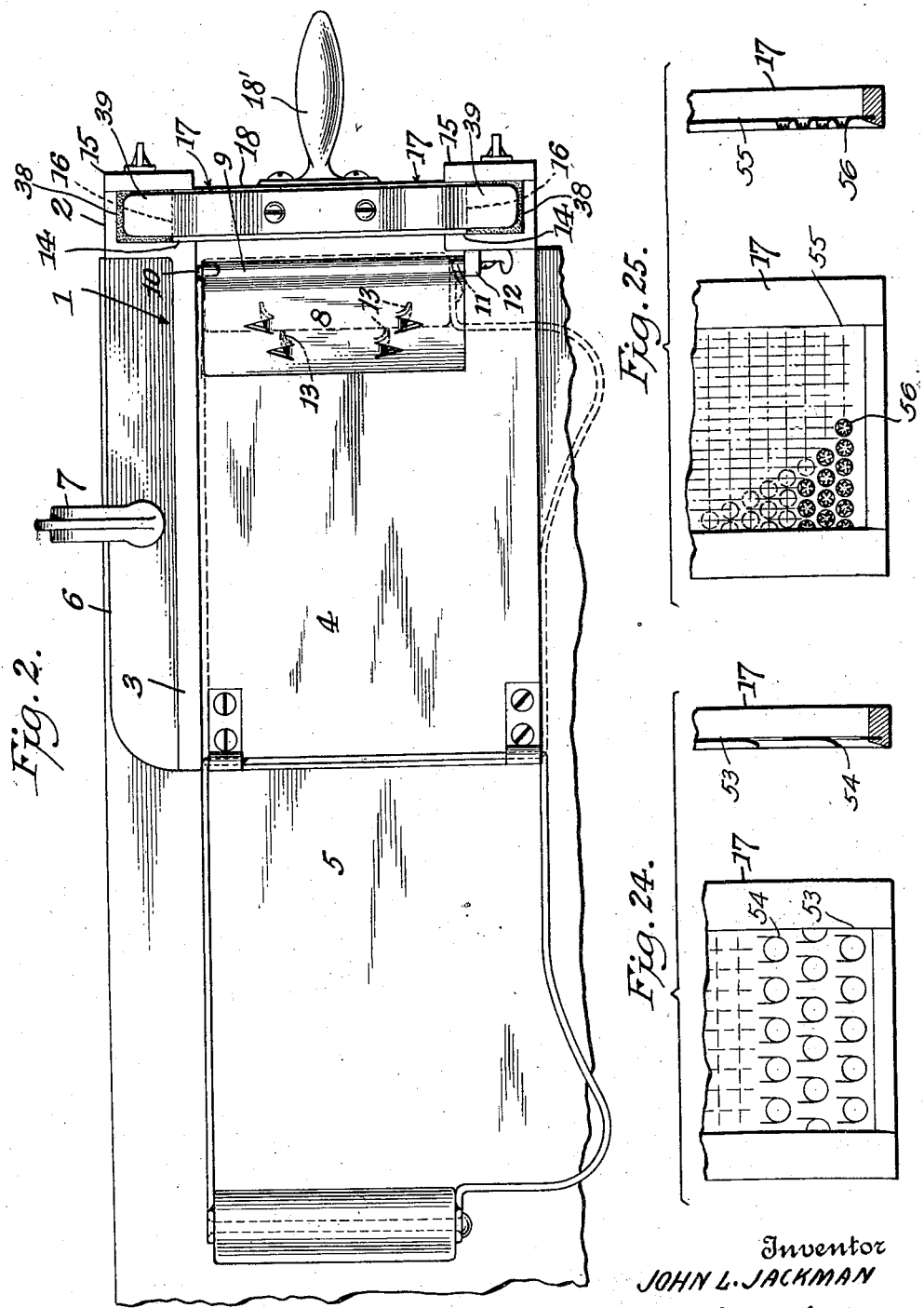
Inventor
JOHN L. JACKMAN
By his Attorney Julian J. Wittal

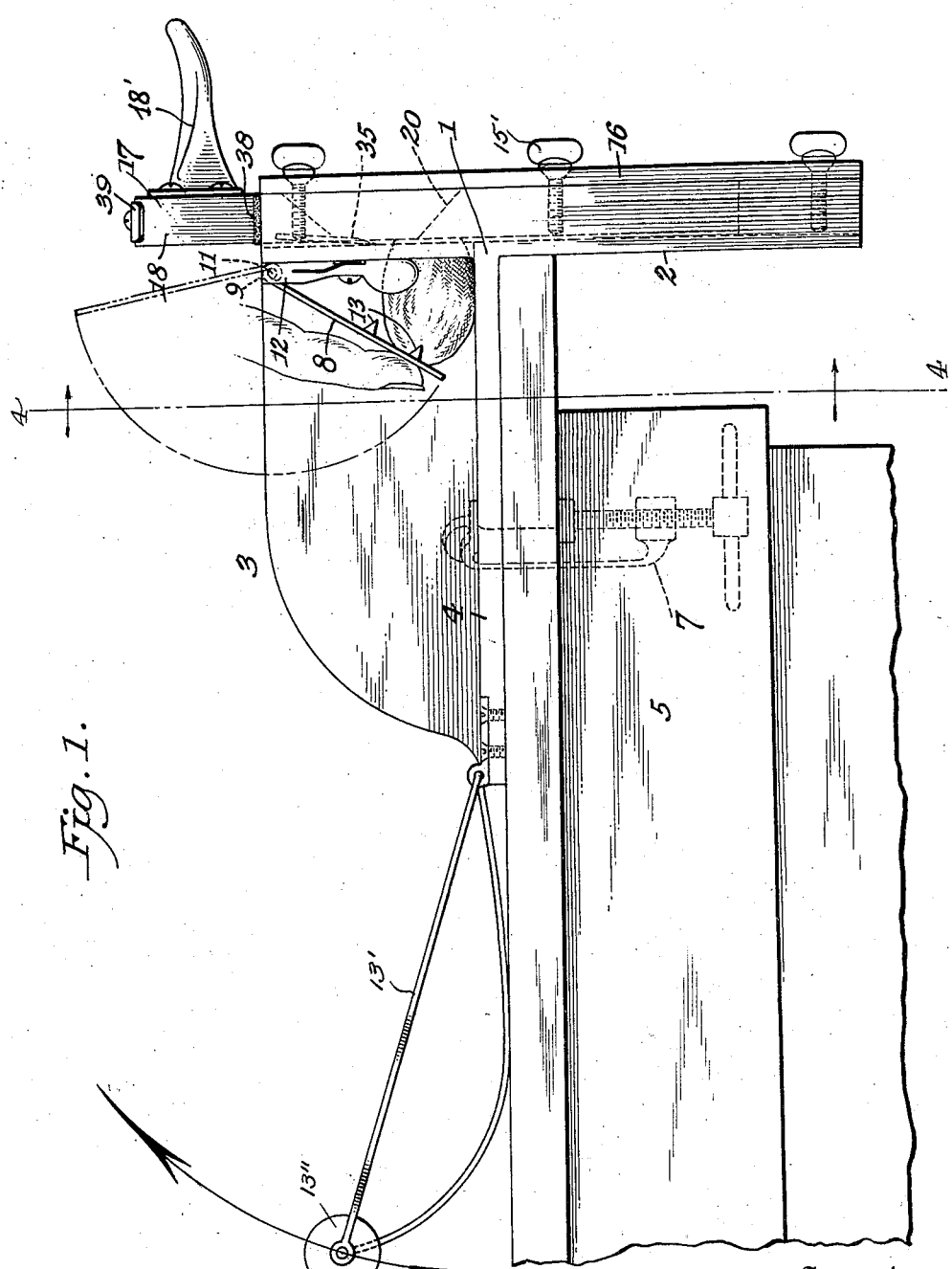

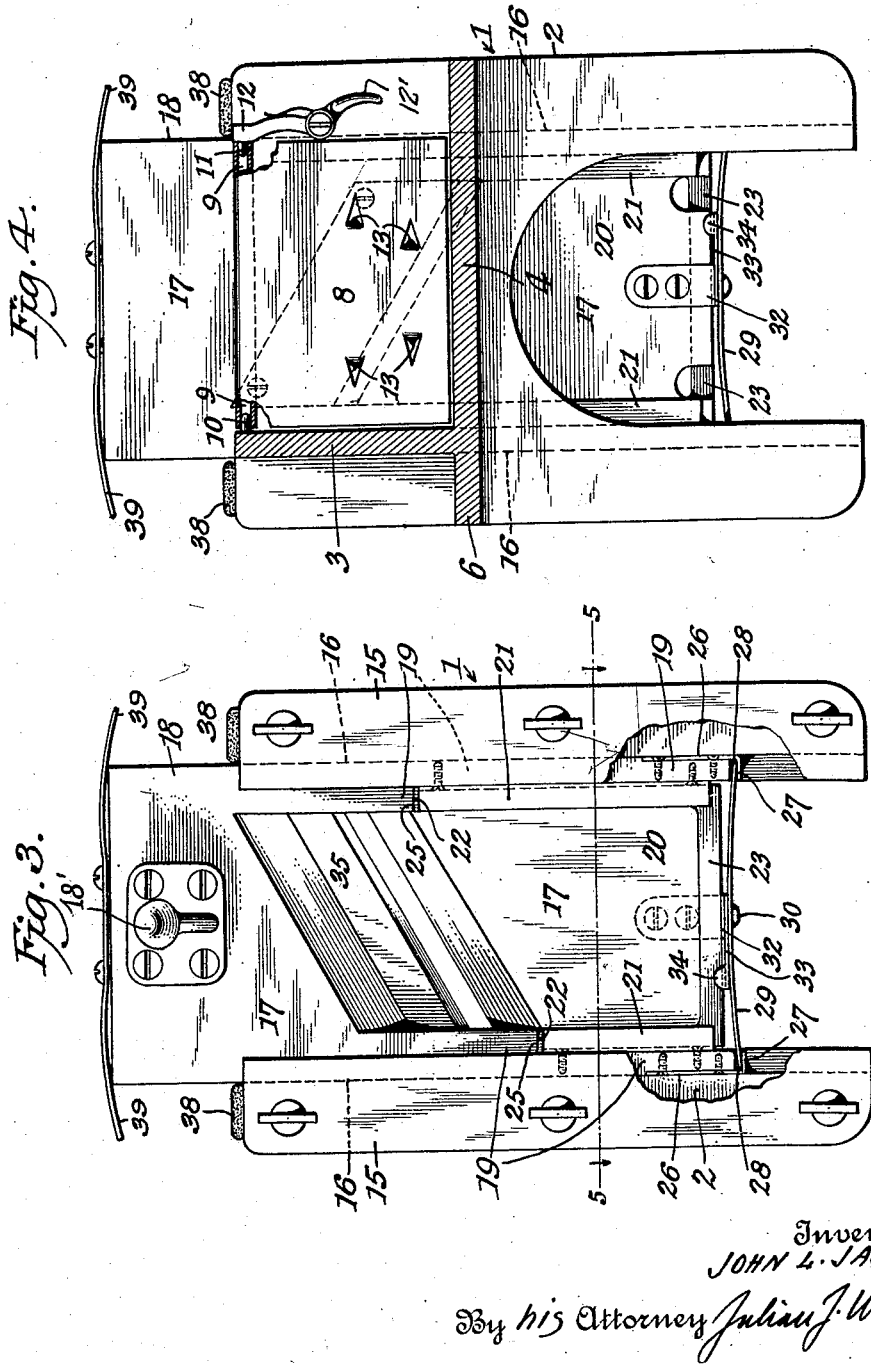

April 22, 1930. J. L. JACKMAN 1,755,446
HOUSEHOLD COMBINATION CUTTING MACHINE
Filed July 14, 1927 5 Sheets-Sheet 4
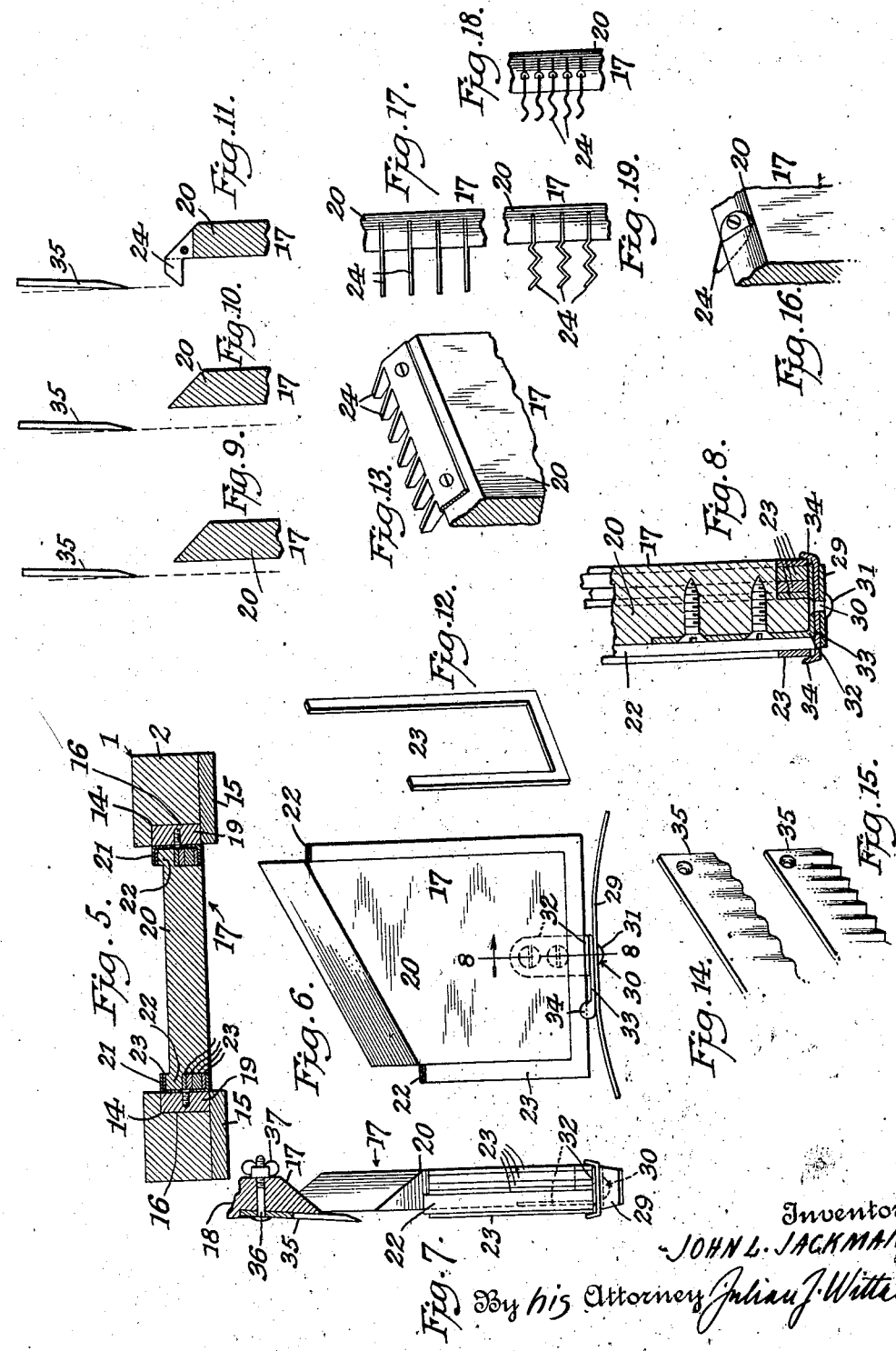

April 22, 1930.　　　　J. L. JACKMAN　　　　1,755,446
HOUSEHOLD COMBINATION CUTTING MACHINE
Filed July 14, 1927　　　5 Sheets-Sheet 5
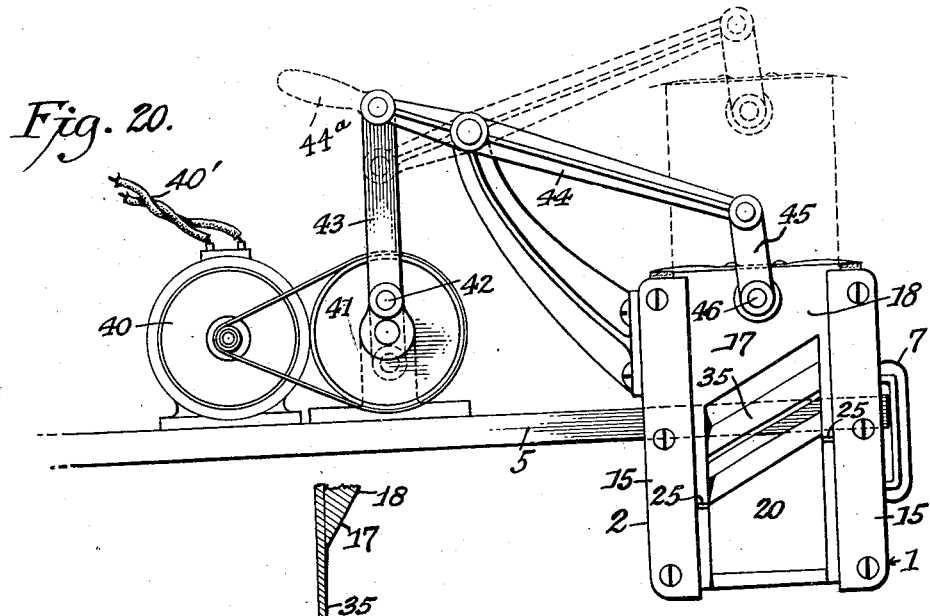
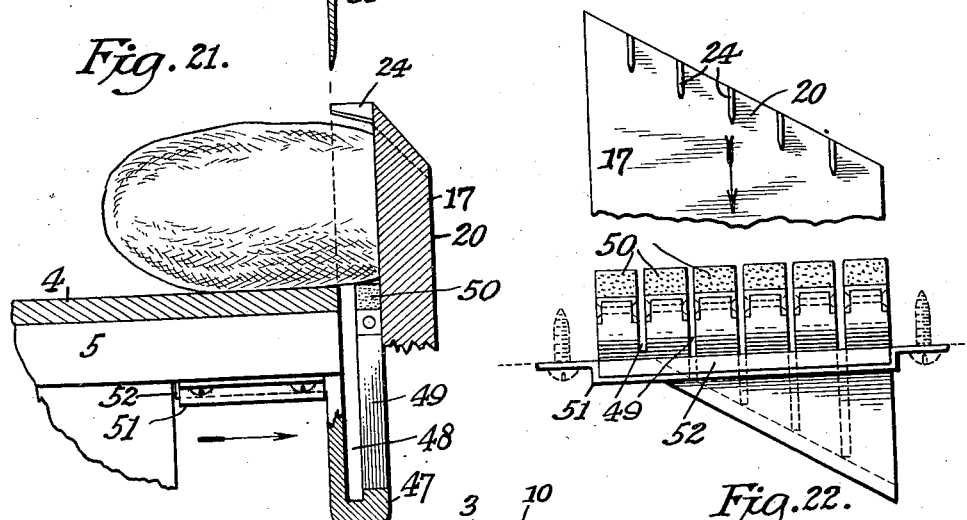
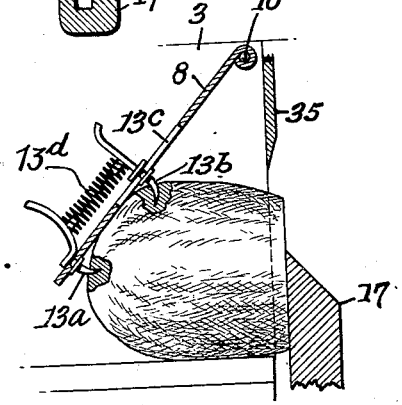
JOHN L. JACKMAN
INVENTOR
BY Julian J. Wittel
ATTORNEY Patented Apr. 22, 1930

1,755,446

UNITED STATES PATENT OFFICE

JOHN L. JACKMAN, OF NEW YORK, N. Y.

HOUSEHOLD COMBINATION CUTTING MACHINE

Application filed July 14, 1927. Serial No. 205,672.

My present invention relates to kitchen utensils, food cutters, graters, and similar household devices and is specifically directed to devices for preparing vegetables and other food stuffs for table use.

The object of the invention resides in improved means for expediting the cutting, shaping, grating and slicing of vegetables, such as potatoes, cabbage, cucumbers, beets, rhubarb, squash, turnips, horseradish, onions, celery and other articles of food such as noodles and the like.

A further object being to provide a practically noiseless device for accomplishing rapid output for restaurants and hotels where a great quantity of vegetables are required daily.

Another object of the invention resides in means whereby salad and other vegetables may be cut in various forms or designs to present an appetizing appearance when properly arranged for service.

A still further object of the invention being to construct the device of readily interchangeable and adjustable parts whereby a single element constituting the supporting frame, may be utilized as a common support for all the interchangeable parts or attachments, to be employed separately, each for a different purpose.

Another object of this invention, resides in the provision of means, controlled by gravitation, for automatically feeding vegetables and the like, to the cutting element.

A feature of the construction is found in a swinging plate having fixed or movable teeth, hooks or projections, whereby the comparatively solid bodied vegetables such as potatoes, beets, radishes, carrots, parsnips and the like, may be fed into the cutting element by slight pressure of the fingers or hand of the operator, without danger of injury.

A further feature resides in means, preferably constituted by shim plates of different cross-sectional thicknesses, for varying the depth or thickness of the cuts made by the device.

Another feature is present in the provision of means whereby the separate cuts of potatoes made by the main or master cutter may be cross cut to provide properly proportioned single cuts for French fried and Julienne fried potatoes at a single movement of the cutter carrying element.

Means are also provided for cutting salad or other vegetables into decorative shapes as for instance, scallops of various contours.

It will be understood that my improved cutter may also be employed for separating and shaping fruit in various shapes for table use.

The invention possesses other advantageous features, which with the foregoing, will be set forth at length in the following description where I shall outline in full that form of the invention which I have selected for illustration in the drawings accompanying and forming part of this specification. The novelty of the invention will be included in the claims succeeding said description.

From this it will be apparent that I do not limit myself to the showing made by said drawings and description as I may adopt many variations within the scope of my invention as set forth in said claims.

The arrangement of the parts may be varied considerably and the present embodiment illustrates the invention now thought to be the best form, but it will be understood that many refinements may be made in the commercial application of the device, provided for the purpose set forth.

To increase the capacity of the device I may employ mechanical hand or motor driving means of a desired design which I will illustrate in the drawings.

In the drawings similar reference characters are employed to designate corresponding parts throughout the several views thereof, in which:—

Fig. 1, is a side elevation of my improved food cutter attached to a table or other support, showing how small vegetables may be fed to the cutter by finger pressure exerted on a swinging guard plate, and also showing another feeding means which is constituted by a roller weight carried in a swinging wire frame, here shown thrown backwardly out of operative position.

Fig. 2, is a plan view of the improved food cutter.

Fig. 3, is a front elevation thereof detached from the supporting table.

Fig. 4, is a cross section taken on the line 4—4 of Fig. 1.

Fig. 5, is a horizontal cross section taken on the line 5—5 of Fig. 3.

Fig. 6, is a detail face view of the gage member of the slidable element.

Fig. 7, is a side edge view thereof.

Fig. 8, is an enlarged fragmentary section taken on the line 8—8 of Fig. 6.

Figs. 9 and 10, are detail sections showing the gage member of the slidable elements as adjusted to different positions relative to the cutting line to vary the thickness of the cut slices.

Fig. 11, is a detail section showing one of a series of cross cutting knives which may be mounted on the upper edge of the gage member.

Fig. 12, is a detail perspective view of one of a number of shim plates employed to hold the gage member in adjusted position.

Fig. 13, is a fragmentary detail perspective showing a series of cross cutting knives carried by a single attaching plate.

Figs. 14 and 15, are fragmentary perspective views of the cutting knife shaped to make decorative cuts.

Fig. 16, is a fragmentary perspective view showing another form of cross cut blade.

Figs. 17, 18, and 19, are fragmentary top plan edge views of the gage member showing further modified forms of cross cut blades.

Fig. 20, is a front elevation of my improved food cutter, showing preferred means for driving the same by an electric motor.

Fig. 21, is a fragmentary sectional side elevation showing a supporting attachment which may be employed when cutting potatoes for French frying.

Fig. 22, is a rear elevation thereof looking in the direction of the arrow in Fig. 21.

Fig. 23, is a sectional detail showing a modified form of guard feed plate wherein the vegetable to be cut is engaged by stationary and movable hooks or pins to hold the same.

Fig. 24, is a fragmentary face view and section of a modified form of cutter wherein a sheet of metal may be mounted in the slidable member and provided with circular openings having one side bent to provide outstanding edges.

Fig. 25, is a fragmentary face view and section of a further modified form of slidable member wherein a sheet of metal is punched out to provide a grater for horseradish and other vegetables.

Referring now to the drawings in detail, I employ a frame 1, comprising a vertical head 2, formed with a side plate 3, and a base plate 4, adapted to lie flat on a table or other support 5.

The plate 4, is extended beyond the side plate 3, to form a flange 6, on which a screw clamp 7 bears to secure the frame 1, in place.

A safety feed plate 8, is formed along its top edge with an integral rolled tube or sleeve 9 and into the inner end of this sleeve, a fixed pin 10, projects from the side plate 3 (Figs. 1, 2 and 4). Another pin 11, carried on a spring pressed pivoted arm 12, having a finger piece 12' enters the opposite, or outer end of said sleeve 9 to support the plate in swinging relation. This plate may be readily removed by manipulating the pivoted arm to withdraw the pin 11, from said sleeve, as will be understood.

The plate 8, is also formed with struck up teeth 13, designed to engage and hold a vegetable in the feeding of the same to the cutter.

Hingedly secured to the rear end of the plate 4 is a yoke member 13' and mounted rotatably on the outer end of said yoke member is a weighted roller 13'' which is adapted to swing in the direction of the arrow shown to the left of Figure 1 and impinge against and urge forwardly the safety plate 8 and the vegetables placed thereunder as indicated by its dotted position in Fig. 2.

The head 2 of the frame 1, has vertically arranged parallel side bars provided with longitudinal recesses 14, (Figs. 2 to 5) forming in conjunction with gib plates 15, which are secured on the head 2 by means of winged screws 15', guide grooves 16, in which a slidable member 17, is operated.

The construction of this slidable member 17, constitutes an important feature of my invention and may be described as follows:

It is formed of two main parts consisting of a cutter plate 18, provided with downwardly projecting side arms 19, between which is received in adjustable relation, a gage plate 20.

Secured on the inner faces of the said side arms 19, are preferably sheet metal channel pieces 21 (Figs. 3 and 5) into which project ribs 22, (Fig. 5) unitary with the gage plate 20, and to adjust said gage plate relative to the line of travel of the cutter, to obtain a desired thickness or depth of cut, I employ shim plates 23, of varying thicknesses which may be arranged within the side flanges of the channel pieces 21, and at one or both sides of the ribs 22, of the gage plate, to adjust it relative to the line of cut as above stated, and by this construction I am enabled, by simply shifting or changing the shim plates to one or the other side of the ribs 22, of the gage plate, to obtain a great variety of desired thickness or depth of slices within certain limits for the purpose hereinafter set forth.

To position the gage plate farthest away or forward of the path of travel of the cutter, I place all of the shims or shim plates 23, at the back of the ribs 22, of the gage plate in the channel pieces 21. This deep or thick cut is desirable in dividing, for instance, potatoes for French frying and when cutting potatoes for this purpose I also employ cross cutting knives or blades 24, secured to the top edge of the gage plate. These cross cutting blades being shown in various forms in Figs. 11, 13, 16, 17, 18, 19, 21 and 22 of the drawings.

The side arms 19 of the cutter plate 18, are reduced at a point about midway of their length to provide shoulders 25, (Fig. 3) which rest against the ends of the side ribs 22 on the gage plate thus preventing endwise movement thereof in one direction, and to hold said gage plate 20 and the shim plates 23 in proper position I secure plates 26, to the sides of the arms 19, at their lower ends. These plates have angular extensions 27, which are arranged in spaced relation with the said ends to provide lock pockets 28, to receive the free ends of a leaf spring 29, which is pivoted centrally of its length on a pin 30, having a head 31 and being riveted or otherwise secured to a bracket plate 32, screwed to the lower end of the gage plate 20, as clearly shown in Fig. 8 of the drawings.

Swiveled on the pin 30, between the spring 29 and the bracket plate 32, is a catch or holding plate 33, provided with oppositely arranged upstanding lugs or ears 34, adapted to engage the outermost shim plates 23, at the bottom to prevent displacement thereof.

The main cutting blade 35, (Fig. 7) may be attached to the cutter plate 18, by bolts 36, having wings 37, or by other desired devices. These cutter blades may be straight or scalloped as shown in Figs. 7, 14 and 15 of the drawings. At the tops of the side guides of the frame 1, cushions 38, are placed, against which the extended ends 39 of a heavy leaf spring impinge, when the cutter plate reaches near its lowermost movements of travel to eliminate noise when the cutter is operated at high speed. The spring ends 39 act as a yielding stop to limit the downward travel of the sliding member 17, when operated by hand, but when said member is operated by motive power, this last named spring is not necessary as the mechanical connections are positive in operation. The handle for hand operation is indicated by the numeral 18'.

In Fig. 20, of the drawings I show an electric motor 40, belted to a pulley 41, having a crank pin 42, connected by a link 43, to a rock lever 44, which in turn is connected by a link 45, to a pin 46 on the cutter plate 18, replacing handle 18', and by this arrangement I can attain great speed of operation in cutting vegetables, noodles, and so on. The current for the motor comes through conductors 40' from any suitable source. The dotted element 44ª is added to the figure to indicate how the lever 44 may be used without the motor drive for efficient hand operation of the device.

In Figs. 21 and 22, of the drawings, there is shown at 47, a support which may be employed when cutting potatoes for French frying, square noodles and the like, and consists of a vertically disposed frame 47, U-shaped in cross section to provide a space 48 to receive the main cutter 35 and slitted vertically to provide spaces 49 disposed at right angles to space 48 to receive the cross cutting knives 24. The frame may be provided with blocks 50, of rubber or other material on which the potatoes etc. rest, and said frame may be removably held on the table 5, by a housing 51, which clampingly holds a horizontal extension 52 of said frame 47 to the underside of the table 5.

In Fig. 23, of the drawings, I show a modified form of feed plate 8, in which the lower pins 13ª, are fixed and the upper pins 13ᵇ, are movable in slots 13ᶜ, the two being pressed together and into the vegetable to be cut by spring 13ᵈ.

Referring to Figure 24, here is illustrated a modfied form of cutter plate 17 and consists of a sheet of metal 53 secured to the cutter plate 17 in any suitable manner. This plate 53 is provided with a series of struck out knife edges 54.

In Figure 25, another modified form of cutter plate 17 is shown and comprises a sheet of metal 55 provided with a series of punched out portions 56 for the purpose of grating or scraping vegetables as will be understood.

What I claim is:—

1. In a food cutter, a frame adapted to be made fast to a fixed object, a member slidable in said frame said member comprising a cutter plate and a gage plate movable therewith, means actuated by gravitation for feeding vegetables to the cutter, said means consisting of a roller weight carried in a yoke hinged to the said frame and a hinged plate urged by said weight, and means for operating said slidable member.

2. In a food cutter, a frame provided with parallel guide grooves, a member slidable in said grooves, said member comprising a cutter carrying plate having side extensions provided with shoulders a gage plate carried between said extensions and being provided with side ribs, means for automatically urging the gage plate upwardly to cause the upper ends of the said ribs to engage the said shoulders on the cutter carrying plate, and means for actuating said slidable member.

3. In a food cutter, a gage for positioning the food relative to the cutter consisting of a plate, shim plates removably mounted between said plate and cutter and a plate pivotally mounted adjacent said shims and adapted to engage the same to removably hold said shims in position.

4. In a food cutter, a gage for adjusting the position of the food relative to the cutter consisting of a plate, ribs formed on said plate, shim plates removably mounted around said ribs and a plate pivotally mounted adjacent said shims to removably hold said shims and gage in position.

Signed at New York, in the county of New York and State of New York, this 7th day of July, A. D. 1927.

JOHN L. JACKMAN.